United States Patent Office 2,806,017
Patented Sept. 10, 1957

2,806,017

POLYMERIZATION OF CYCLIC CARBAMATES

Erhart K. Drechsel, Springdale, Conn., assignor to American Cyanamid Company, New York, N. Y., a corporation of Maine No Drawing. Original application August 9, 1952, Serial No. 303,609, now Patent No. 2,744,897, dated May 8, 1956. Divided and this application November 29, 1955, Serial No. 549,889

5 Claims. (Cl. 260—77.5)

This application is a division of my copending application Serial No. 303,609, filed August 9, 1952, now Patent No. 2,744,897, dated May 8, 1956.

The present invention relates to the preparation of linear polymeric materials from a cyclic carbamate.

The cyclic carbamates or urethanes used in practicing the prevent invention may be represented by the general formula

I

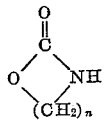

where $n$ represents a whole number selected from the class consisting of 3 and 4. The cyclic carbamates embraced by this formula are 2-ketotetrahydro-1,3-oxazine, which also may be named O,N-trimethylene carbamate, and 2 - ketohexahydro - 1,3 - oxazepine, which also may be named O,N - tetramethylene carbamate. They have many valuable uses in industry, for example as plasticizers of resinous and other materials, and as intermediates in the production of other valuable compositions. They constitute a particularly useful class of monomers from which polymeric products are produced by isomerization. The solid, higher-molecular-weight polymers (e. g., those having an average molecular weight not less than 10,000, more particularly an average molecular weight ranging from 10,000 or 20,000 to 75,000 or 100,000 or higher, as determined from viscosity measurements of dilute solutions using thte Staudinger equation) are fiber-forming polymers from which fibers or filaments having particular and peculiar properties can be produced. The solid polymers of the cyclic carbamates embraced by Formula I are useful in coating, molding, laminating adhesive, textile-treating, paper-treating and other applications where other synthetic resins are now being used.

Various methods can be employed for producing the cyclic carbamates embraced by Formula I. One convenient and economical method comprsises effecting a Beckmann rearrangement of the corresponding hydroximic acid represented by the general formula

II

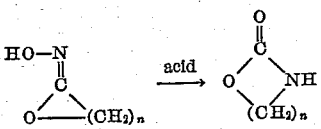

where $n$ has the same meaning as given above with reference to Formula I, and then isolating a cyclic carbamate corresponding to the hydroximic acid employed from the resulting reaction mass, e. g., by distillation under heat and vacuum.

The Beckmann rearrangement as applied to other compounds is well known in chemistry (see, for instance, Sidgwick's "The Organic Chemistry of Nitrogen," new edition, revised and rewritten by Taylor and Baker, 1937, especially pages 19, 49, 177, 199–201, 472 and 573; also, U. S. Patents 2,249,177 and 2,234,566). The equation for this reaction (Beckmann rearrangement) may be written as follows:

III

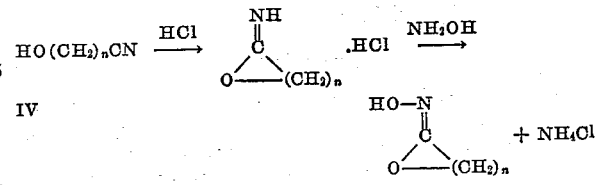

The hydroximic acids embraced by Formula II can be produced by various methods; for example, they may be prepared by the reactions represented by the following equations:

IV

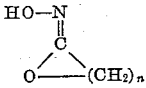

In Equations III and IV, $n$ has the same meaning as given above with reference to Formulas I and II.

Another suitable method for preparing one of the cyclic carbamates embraced by Formula I, specifically 2-ketotetrahydro - 1,3 - oxazine, comprises effecting alcoholysis of N - (3 - hydroxypropyl) - O - alkyl carbamate under heat, and isolating 2 - ketotetrahydro - 1,3 - oxazine from the resulting reaction mass. The O-alkyl substituent is preferably an O-(lower alkyl) substituent, e. g., O-methyl, -ethyl, -propyl, -isopropyl, -$n$-butyl, -isobutyl, -sec.-butyl, -amyl, etc. Thus, I may prepare 2-ketotetrahydro - 1,3 - oxazine by effecting reaction between equimolecular proportions (or with the one reactant from, for example, 0.01 to 10 mole percent in excess of the other) of 3-aminopropanol and a dialkyl carbonate, e. g., diethyl carbonate, dipropyl carbonate, etc., to obtain the corresponding N - (3 - hydroxypropyl) - O - alkyl carbamate, distilling off the alcohol by-product of the initial reaction, and continuing the distillation under heat (usually also under vacuum) to remove the remaining combined alcohol, whereby the N - (3 - hydroxypropyl) - O-alkyl carbamate is cyclized and 2-ketotetrahydro-1,3-oxazine is formed, after which the said 1,3-oxazine is isolated, e. g., by distillation, from the reaction mass. The temperature required for removing the remaining combined alcohol and forming the 1,3-oxazine varies depending, for example, upon the particular alcohol to be removed and the vacuum (if any) employed, e. g., from 40° C. to 200° C.

The conversion of the N-(3-hydroxypropyl)-O-alkyl carbamate to the cyclic carbamate, whereby combined alcohol is evolved, is preferably carried out with the aid of an alcoholysis catalyst. Examples of such catalysts which may be used are alkali metals, alkaline-earth metals and certain heavy metals (e. g., lead, zinc, manganese, etc.) or oxides, carbonates or salts thereof. Any suitable amount of an alcoholysis catalyst can be employed, as desired or as conditions may require, e. g., from 0.0001% to 1 or 2% by weight of the intermediate, N-(3-hydroxypropyl)-O-alkyl carbamate.

During the preparation of the cyclic carbamate and its isolation by distillation, some polymer of the carbamate also is formed in varying amounts and remains in the residue.

The polymer of the carbamate also can be produced by isomerization of the isolated monomer, e. g., by heating the said monomer at temperatures ranging from about 40° to 200° C. The isomerization can be accelerated by the use of a suitable catalyst or catalysts, for instance, traces of a monohydric alcohol (e. g., methyl, ethyl, propyl, etc., alcohols), or of an alkali-metal carbonate, e. g., potassium carbonate, etc., or of a Friedel-Crafts catalyst, e. g., zinc chloride, aluminum chloride, sulfuric acid, hydrogen fluoride, boron trifluoride, BF₃-ethyl ether complex, etc. Traces of water also may sometimes be used advantageously as a polymerization catalyst. With certain catalysts, for example Friedel-Crafts catalysts, the isomerization of the monomer to a polymer may be effected at temperatures substantially below 40° C., for instance at from −80° C. to 20° or 30° C., in which case the reaction is usually effected in a liquid medium which is inert during the reaction and in which the monomer can be dissolved or readily dispersed.

In order that those skilled in the art may better understand how the present invention can be carried into effect, the following examples are given by way of illustration and not by way of limitation. All parts and percentages are by weight.

*Example 1*

To a reaction vessel is added 118 parts of diethyl carbonate at 25° C., after which 75 parts of 3-aminopropanol is added with stirring. This is in the ratio of 1 mole of diethyl carbonate to 1 mole of 3-aminopropanol. Initially a two-phase system forms in the reaction vessel; however, when the reaction mass is stirred for about 16 hours at room temperature (25°–30° C.), it becomes clear and homogeneous.

The reaction vessel is now fitted with a column and a distillation head. An alcoholysis catalyst, e. g., a few shavings of metallic sodium (about 0.5 part), are added to the reaction mass comprising the intermediate reaction product, HO(CH₂)₃NH—COOC₂H₅, and the ethanol by-product of the initial reaction is removed by distillation. Some of the combined ethanol is removed at the same time. In this distillation 72 parts of volatile matter comprising mostly ethanol and boiling at 78°–80° C. is recovered. After changing the apparatus for vacuum distillation, an additional 18 parts of volatile matter (also comprising chiefly ethanol) is removed under vacuum. About 10% of this material is apparently not ethanol. The total conversion is then calculated as follows:

$$\frac{72+(18-1.8)}{92}=\frac{88.2}{92}=96\%$$

Vacuum distillation is continued with the pressure lowered to 1.5 to 2 mm. mercury while gradually raising the temperature. At a vapor temperature of 150°–155° C. a yellow, viscous oil comprising 2-ketotetrahydro-1,3-oxazine is distilled off. This oil is collected in a receiver surrounded by Dry Ice and wherein it solidifies. After collecting 35 parts of this material, the vapor temperature in the distilling head drops sharply and no more distillate is recovered.

The residue in the reaction vessel is a dark brown resin (polymer of 2-ketotetrahydro-1,3-oxazine), which, even when hot, can be poured only with difficulty. It has an average molecular weight substantially above 10,000 as calculated from viscosity measurements of a dilute solution using the Staudinger equation. It is a fiber-forming material. Fibers or filaments can be formed from this polymer by conventional melt-extrusion technique or by other means. The extruded filaments can be drawn either hot or cold. The drawn or stretched fibers or filaments show, by characteristic X-ray patterns, orientation along the fiber axis.

The monomeric reaction product comprising 2-ketotetrahydro-1,3-oxazine is a liquid at room temperature (25°–30° C.). It is readily soluble in water, methanol and benzene but is insoluble in hexane. Attempts to recrystallize it from solvent and non-solvent mixtures, e. g., mixtures of hexane and benzene, and of hexane and methanol, result in "oiling out" of the liquid product. From the setting-point curve a melting-point value of 21.2° C.–21.4° C. is obtained.

The above reaction may be illustrated by the following equation:

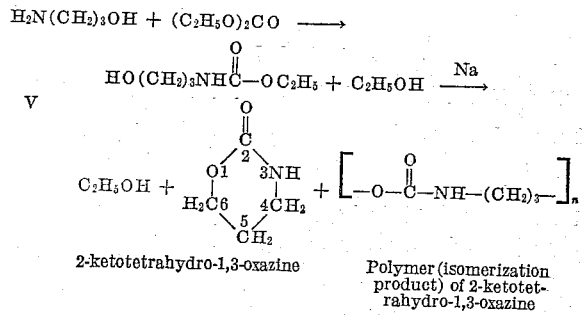

2-ketotetrahydro-1,3-oxazine        Polymer (isomerization product) of 2-ketotetrahydro-1,3-oxazine In the above equation $n$ represents the number of the recurring units in the polymer molecule, e. g., from 2 to 1000 or more. The dimers, trimers, tetramers, pentamers, hexamers and other lower-molecular-weight products, and mixtures thereof, can be used in various industrial applications, for instance as plasticizers for resinous aldehyde-reaction products of urea, aminotriazines (e. g., melamine) or other amidogen compounds, as well as for plasticizing other compatible resinous materials which normally are deficient in plasticity or flow characteristics. As has been indicated hereinbefore, the higher-molecular-weight, normally solid polymers are useful in making fibers (including both mono- and multifilaments).

*Example 2*

To 12 parts of 85% sulfuric acid is added 10 parts of tetramethylene hydroximic acid. This mixture is heated cautiously until bubbles first appear. The heating is discontinued and the violent reaction which ensues permitted to subside. This acid solution is cooled to 0° C. and carefully made alkaline with 24% potassium hydroxide solution, taking care to keep the temperature below 10° C. with adequate cooling at all times. The potassium sulfate which separates is washed twice with 5 parts of chloroform. The neutral filtrate is extracted five times with 10 parts of chloroform. The combined chloroform extracts are washed with 5 parts water to eliminate traces of alkali. Removal of the chloroform solvent yields the desired 2-ketohexahydro-1,3-oxazepine.

Similar technique can be used in making 2-ketotetrahydro-1,3-oxazine from trimethylene hydroximic acid.

*Example 3*

To 100 parts of the isolated 2-ketotetrahydro-1,3-oxazine of Example 1 is added 1 part of potassium carbonate. The resulting mixture is heated for 2 hours while passing a slow stream of pre-purified nitrogen gas over the mass. During this heating period the liquid monomer thickens considerably. Heating is continued for an additional 8 hours under the same conditions, yielding a hard polymer of the starting 1,3-oxazine.

It was quite surprising and unexpected that the 6- and 7-membered cyclic carbamates could be isomerized to linear polymers, since the corresponding 5-membered cyclic carbamates do not undergo this isomerization.

In my application Serial No. 372,405, filed August 4, 1953, as a division of Serial No. 303,609 (also parent to the instant application), and which has now matured into U. S. Patent No. 2,701,246, dated February 1, 1955, claims are made to the method of preparing 2-ketotetrahydro-1,3-oxazine which comprises effecting alcoholysis of N-(3-hydroxypropyl)-O-lower alkyl carbamate at a temperature of from 40° C. to 200° C., and isolating 2-ketotetrahydro-1,3-oxazine from the resulting reaction mass.

I claim:

1. The method of preparing a new polymeric material which comprises heating a cyclic carbamate represented by the general formula

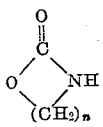

where $n$ represents a whole number selected from the class consisting of 3 and 4 at a temperature of from about 40° C. to about 200° C., thereby to convert the said carbamate to a linear polymer.

2. A method as in claim 1 wherein the cyclic carbamate is heated while admixed with a monohydric alcohol as a catalyst for the reaction.

3. A method as in claim 1 wherein the cyclic carbamate is heated while admixed with an alkali-metal carbonate as a catalyst for the reaction.

4. The method of preparing a new polymeric material which comprises heating 2-ketotetrahydro-1,3-oxazine at a temperature ranging from about 40° C. to about 200° C. until the said oxazine has been converted to a linear polymer.

5. The method of obtaining a new polymeric material which comprises converting N-(3-hydroxypropyl)-O-alkyl carbamate at a temperature of from about 40° C. to about 200° C. to 2-ketotetrahydro-1,3-oxazine, distilling 2-ketotetrahydro-1,3-oxazine from the reaction mass, and collecting the linear polymer of 2-ketotetrahydro-1,3-oxazine that remains in the residue and which is produced during the aforesaid preparation and isolation of the said oxazine.

References Cited in the file of this patent

UNITED STATES PATENTS

| 2,241,321 | Schlack | May 6, 1941 |

FOREIGN PATENTS

| 61,475 | Denmark | Oct. 11, 1943 |
| 906,181 | France | May 7, 1945 |